(12) United States Patent
Koç et al.

(10) Patent No.: US 7,050,579 B1
(45) Date of Patent: May 23, 2006

(54) CRYPTOGRAPHIC METHODS AND APPARATUS USING WORD-WISE MONTGOMERY MULTIPLICATION

(75) Inventors: Çetin K. Koç, Corvallis, OR (US); Erkay Savaş, Corvallis, OR (US)

(73) Assignee: State of Oregon acting by and through the State Board of Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/558,138

(22) Filed: Apr. 25, 2000

Related U.S. Application Data (60) Provisional application No. 60/193,676, filed on Mar. 31, 2000.

(51) Int. Cl.
 *H04L 9/28* (2006.01)
(52) U.S. Cl. .................. 380/28; 708/135; 708/491
(58) Field of Classification Search ............... 708/491, 708/135, 490, 492, 654; 380/28
See application file for complete search history.

(56) References Cited

U.S. PATENT DOCUMENTS

| 6,088,453 A * | 7/2000 | Shimbo ................ 380/28 |
| 6,795,553 B1 * | 9/2004 | Kobayashi et al. ........ 380/28 |

OTHER PUBLICATIONS

C.K. Koc et al., "Analyzing and Comparing Montgomery Multiplication Algorithms," *IEEE Micro* 16:26-33 (Jun. 1996).*

B. S. Kaliski, Jr., "The Montgomery Inverse and Its Applications," *IEEE Transactions on Computers* 44:1064-1065 (Aug. 1995).

P. L. Montgomery, "Modular Multiplication Without Trial Division," *Mathematics of Computation* 44:519-521 (Apr. 1985).

Ç. K. Koç et al., "Analyzing and Comparing Montgomery Multiplication Algorithms," *IEEE Micro* 16:26-33 (Jun. 1996).

Menezes, et al., *Handbook of Applied Cryptography*, p. 600-603 (CRC Press 1997).

S. Even, "Systolic Modular Multiplication," *Advances in Cryptology*, Lecture Notes in Computer Science 537:619-624 (Springer Verlag 1990).

Bosselaers et al., "Comparison of Three Modular Reduction Functions," Crypto '93, pp. 175-186 (1993).

Koc et al., "Carry-save Adders for Computing the Products AB Modulo N," *Electronics Letters* 26:899-900 (Jun. 21, 1990).

(Continued)

*Primary Examiner*—Justin T. Darrow
(74) *Attorney, Agent, or Firm*—Klarquist Sparkman, LLP (57) ABSTRACT

Cryptographic methods and apparatus are provided for determination of multiplicative inverses. A Montgomery radix is selected based on a wordsize, permitting word-wise Montgomery multiplication. Using word-wise Montgomery multiplication, methods and apparatus determine various multiplicative inverses with reduced computation time.

6 Claims, 4 Drawing Sheets

OTHER PUBLICATIONS

C.K. Koc., "Montgomery Reduction with Even Modulus," IEEE Proc.-Compt. Digit Tech., 141:314-316 (Sep. 5, 1994).

Paar et al., "Fast Arithmetic Architectures for Public-Key Algorithms over Galois Fields $GF((2^n)^m)$," Eurocrypt '97, p. 363-378 (May 11, 1997).

Leu et al., "A Scalable Low-Complexity Digit-Serial VLSI Architecture for RSA Cryptosystem." SiPS 99 IEEE Workshop on Signal Processing Systems, p. 586-595 (1999).

Bartee et al., "Computation with Finite Fields," Information and Control 6:79-98 (1963).

C.D. Walter, "Faster Modular Multiplication by Operand Scaling," Advances in Cryptology: Lecture Notes in Computer Science 576:313-323 (1992).

Bajard, et al., "An RNS Montgomery Modular Multiplication Algorithm," IEEE Trans. on Computers, 47:766-776 (Jul. 1998).

Koc et al., "Montgomery Multiplication in $GF(2^k)$," Designs, Codes and Cryptography, 14:57-69 (Apr. 1998).

G.B. Agnew et al., "Arithmetic Operations in $GF(2^m)$," Journal of Cryptology, p. 3-13 (1993).

\* cited by examiner

CRYPTOGRAPHIC METHODS AND APPARATUS USING WORD-WISE MONTGOMERY MULTIPLICATION

This application claims the benefit of provisional application 60/193,676 filed Mar. 31, 2000.

FIELD OF THE INVENTION

The invention pertains to cryptographic methods and apparatus.

BACKGROUND OF THE INVENTION

Basic arithmetic operations such as addition, multiplication, and inversion performed modulo a prime number p have numerous applications to cryptographic systems. For example, encryption, decryption, or key exchange in Rivest-Shamir-Adelman (RSA), Diffie-Hellman (DH), Digital Signature Standard (DSS), and elliptic curve cryptographic systems all use modular arithmetic operations. These cryptographic systems are described in, for example, W. Diffie and M. E. Hellman, "New Directions in Cryptography," *IEEE Trans. Information Theory*, vol. 22, pp. 644–654 (1976); B. S. Kaliski Jr., "The Montgomery Inverse and Its Applications," *IEEE Trans. Computers*, vol. 44, pp. 1064–1065 (1995); J. J. Quisquater and C. Couvreur, "Fast Decipherment Algorithm for RSA Public-Key Cryptosystem," *Elect. Lett.*, vol. 18, pp. 905–907 (1982); and "Digital Signal Standard (DSS)," *Fed. Reg.*, vol. 56, p. 169 (1991).

Modular arithmetic is typically performed on a set $Z_p$ of integers, referred to as a "complete residue" set that is generally defined as, for a selected prime number p, the set of integers 0, 1, 2, 3, ..., p-1. A complete residue set $Z_p$ is closed with respect to the operations of addition and multiplication, i.e., the sums and products of any elements of the complete residue set $Z_p$ are also elements of the complete residue set $Z_p$. In addition, each element of $Z_p$ has a multiplicative inverse that is also an element of the complete residue set $Z_p$.

Multiplication and addition on the complete residue set $Z_p$ are similar to standard multiplication and division, but are performed modulo the prime number p. For example, the modular product a·b (mod p) is obtained by calculating the product a·b, and then dividing by p one or more times to obtain a remainder that is an element of the complete residue set $Z_p$. As a specific example, the product of integers a=5, b=6 computed modulo-p for p=11, is a·b=5·6 (mod 11)=30 (mod 11)=8. The modular inverse $a^{-1}$ of an element a of $Z_p$ is the element of $Z_p$ such that $a \cdot a^{-1}=1$ (mod p). As a specific example, for a=6, p=11, $a^{-1}=2$ because 6·2 (mod 11)=1.

Many important cryptographic systems require a substantial number of modular multiplications and computations of modular multiplicative inverses.

As used herein, "inverse" and "inversion" refer to inverse operations with respect to multiplication. Fast, efficient multiplication and inversion methods are needed to carry out such calculations. One such method is the Montgomery method, described in P. L. Montgomery, "Modular Multiplication Without Trial Division," *Math. of Computation*, vol. 44, pp. 519–521 (1985), in which integers a that are elements of the complete residue set $Z_p$ are transformed into corresponding integers A referred to as "M-residues" (also elements of Zp) according to the transformation $A = a \, 2^n$ (mod p), wherein the integer n is selected so that $2^{n-1} \leq p < 2^n$.

A Montgomery product MPROD of two M-residues A, B of respective integers a, b is defined as:

$$C = MPROD(A,B) = A \, B \, 2^{-n} \pmod{p},$$

and is the M-residue of the modulo-p product c=a b. The product c can be obtained from the M-residue product C as:

$$c = C \, 2^{-n} \pmod{p}.$$

Calculation of the modular product c=ab using the Montgomery product of the M-residues A, B of a, b is typically faster than direct modular multiplication of a, b because the Montgomery product requires only divisions by two that are easily implemented as bit-shifting operations on a binary number-based digital computer.

Modular exponentiation and modular multiplicative inversion are other common operations in cryptographic systems. In many cryptographic applications, both an M-residue of c, i.e., $C = c \, 2^n$ (mod p) and a quantity referred to as a "Montgomery inverse" are needed. A particular Montgomery inverse $c^{-1} 2^n$ (mod p) and a method for its computation are discussed in B. S. Kaliski Jr., "The Montgomery Inverse and Its Applications," cited above. This Montgomery inverse is referred to as a "Kaliski inverse" KINV( ) herein. With reference to Table 1, the Montgomery inverse KINV(a) is obtained by first calculating an intermediate value $a^{-1} 2^k$ (mod p) in a phase I, and then correcting this intermediate value to obtain the Montgomery inverse $KINV(a) = a^{-1} 2^n$ (mod p) in a phase II.

TABLE 1

Pseudocode for determination of a Montgomery inverse

PHASE I input a, p, wherein 1 ≤ a ≤ p−1
u = p; v = a; r = 0; s = 1
k = 0
while (v > 0)
    if u is even then u = u/2, s = 2s
    else if v is even then v = v/2, r = 2r
    else if u > v then u = (u−v)/2, r = r+s, s = 2s
    else if v ≧ u then v = (v−u)/2, s = s+r, r = 2r
    k = k + 1
if r ≧ p then r = r−p
return r = $a^{-1}2^k$ (mod p), and k, wherein n ≤ k ≤ 2n

PHASE II

Input r, k, p (from PHASE I)
for I = 0 to I = k−n, do
    if r is even then r = r/2
    else then r = (r+p)/2
x = r
return x, wherein 1 ≤ x ≤ p − 1 and x = $a^{-1}2^n$ (mod p)

Unfortunately, obtaining a Montgomery product MPROD or a Montgomery inverse KINV( ) using the Montgomery product typically requires transforming numbers expressed as elements of the complete residue set Zp to and from their respective M-residues. These transformations make such calculations slow and expensive. In addition, because cryptographic systems often require many modular multiplications, the speed and efficiency of such calculations can limit the utility of a cryptographic system. Hence, improved methods and apparatus are needed for obtaining Montgomery products and Montgomery inverses.

SUMMARY OF THE INVENTION

According to a first aspect of the invention, methods are provided for transforming a message represented as an element of a complete residue set modulo a prime number p into a Montgomery residue of a multiplicative inverse. The methods include selecting a Montgomery radix $R=2^m$, wherein m is an integer multiple of a wordsize and m is greater than a bit-length of the prime number p. An "almost Montgomery inverse procedure" is used to determine quantities (r, k), wherein r is an intermediate value and k is an integer. If k is greater than m, then a multiplicative inverse is obtained as a Montgomery product of r and $2^{2m-k}$. If k is less than or equal to m, then r is assigned a new value that is equal to a Montgomery product of r and a square of the Montgomery radix R modulo the prime number p, and k is assigned a value k=k+m. The multiplicative inverse is then obtained as a Montgomery product of r and $2^{2m-k}$. In representative embodiments, a stored value of $R^2$ mod p is retrieved and the method is implemented as instructions contained on a computer-readable medium.

According to another aspect of the invention, methods are provided for obtaining a classical inverse of a message, represented as a series of binary digits, that is an element of a residue set modulo a prime number p.

The methods include obtaining values (r,k) using almost Montgomery inverse procedure, wherein a Montgomery radix $R=2^m$, and m is an integer multiple of a wordsize and is greater than a bit-length of the prime number p. If k is less than or equal to m, then a classical inverse is calculated as a Montgomery product of r and $2^{m-k}$. If k is greater than m, then r is assigned a value equal to a Montgomery product of r and 1, and k is assigned a value of k−m. The classical inverse is then calculated as a Montgomery product of r and $2^{m-k}$.

According to another aspect of the invention, cryptographic systems are provided that include modules for performing such methods. The systems include hardware, software, or a combination thereof. Computer-readable media containing instructions for these methods are also provided.

The cryptographic methods can include representing a message as a series of binary digits, the series being divisible into an integer number m of words. A prime number p is selected and an intermediate product r and an integer k are obtained using an almost Montgomery inverse procedure, wherein a Montgomery radix $R=2^m$, and m is greater than a bit-length of the prime number p. If k is greater than m, then a multiplicative inverse is computed as a Montgomery product of r and $2^{2m-k}$. If $k \leq m$, then r is assigned a value equal to a Montgomery product of r and $R^2$, and k is assigned a value of k+m. A multiplicative inverse is then computed as a Montgomery product of r and $2^{2m-k}$. The methods can further comprise retrieving a stored value of $R^2$ mod p.

According to another aspect of the invention, methods are provided for computing a classical inverse of a message a that is represented as a sequence of binary digits. The methods include obtaining $r=a^{-1}2^m$ (mod p), wherein m is an integer that is an integer multiple of a wordsize, a Montgomery radix $R=2^m$, and p is a prime number. The multiplicative inverse is then calculated as a Montgomery product of r and 1.

In additional methods, a Montgomery product r of a message a with a square of a Montgomery radix $R=2^m$ is obtained, and an inverse KINV(r) is computed to obtain a classical inverse of a.

Methods of computing a multiplicative inverse of an M-residue $A=a2^m$ mod p, wherein p is a prime number, can include computing an intermediate product r and an integer k using an almost Montgomery inverse procedure. If k is greater than m, then the intermediate product r is assigned the value of the Montgomery product of r and $R^2$, and a multiplicative inverse is obtained as a Montgomery product of r and $2^{2m-k}$ using a Montgomery radix $R=2^m$. If k is less than or equal to m, then r is assigned a value equal to a Montgomery product of r and $R^2$, and k is assigned a value of k+m. Montgomery products with $R^2$ and $2^{2m-k}$ then are obtained to produce the multiplicative inverse.

Computer-readable media containing instructions for performing these methods also are provided as well as cryptographic systems that include hardware, software, or a combination thereof for performing these methods.

Cryptographic methods for processing a series of binary digits divided into an integer number m of words can include executing an almost Montgomery inverse procedure to obtain an intermediate value r and an integer k. The intermediate value r is then transformed by determining a Montgomery product of r with respect to a Montgomery radix $R^2$ $2^m$ and a prime number p.

In additional embodiments, cryptographic methods include selecting a Montgomery radix based on a number of words in a message and performing a Montgomery multiplication to transform the message.

These and other features and advantages of the invention are described below with reference to the accompanying drawings.

DETAILED DESCRIPTION

As used herein, lower-case letters represent elements of a complete residue set $Z_p$, upper-case letters represent corresponding M-residues, and p is a prime number. Unless stated otherwise, modular multiplications are carried out modulo-p. An M-residue of an element a of $Z_p$ is defined as A=a R mod p, wherein $2^{n-1}<p<2^n$, n is an integer, and $R=2^n$ is a Montgomery radix. Although M-residues of the elements of the complete residue set are also elements of $Z_p$, for convenience herein, untransformed elements of $Z_p$ are referred to as "C-residues," while values obtained as A=a R mod p are referred to as "M-residues."

A Montgomery product of M-residues A,B is defined as:

$C=MPROD(A,B)=A\,B\,R^{-1}$ (mod p), wherein C is an M-residue of the product a b (mod p) and $R=2^n$ is a Montgomery radix, wherein $n \leq p$. A multiplicative inverse KINV( ), as described in the Kaliski reference cited above, is defined as $KINV(a)=a^{-1}R$ mod p, and a Montgomery product of a and the Kaliski inverse KINV(a) is:

MPROD(a, KINV(a))=a $a^{-1}2^n\,2^{-n}$ (mod p)=1 (mod p).

This product is the M-residue of $2^{-n}$.

With reference to Table 1, above, the Kaliski inverse KINV(a) of a can be obtained by first calculating an intermediate value $a^{-1}2^k$ (mod p) in a phase I, and then correcting this intermediate value to obtain the inverse $KINV(a)=a^{-1}2^n$ (mod p) in a phase II. For convenience, the phase I output of the procedure of Table 1 is referred to herein as an "almost" Montgomery inverse ("AMI") and is defined as:

$$(r, k) = AMI(a) = a^{-1} 2^k \pmod{p},$$

wherein r is referred to as an "intermediate value" of a multiplicative inverse, and $2^k$ is an intermediate radix. Because the phase I output includes r and k, the value of k is included as a result of the almost Montgomery inverse AMI( ). The procedure of Phase I is referred to as an "AMI procedure."

Many cryptographic operations using Montgomery products involve both a C-residue (or M-residue) and an inverse thereof. For example, a "classical" inverse $a^{-1}$ of a is defined such that a $a^{-1}$=1 mod p. Additional inverses and methods for obtaining inverses are described below. For clarity, the classical inverse $a^{-1}$ is also written as CINV(a).

To permit increased computational efficiency, a modified radix $R_m = 2^m$ is substituted for the conventional Montgomery radix $R = 2^n$, wherein m is an integer multiple of a number of bits w in a word ("word size"). The word size typically depends on the computer or other computational hardware used for encryption or decryption. Any value of m greater than or equal to a number of bits in the modulus p is suitable, but for increased efficiency, the smallest multiple of w that is greater than or equal to p is preferable. A word-length radix permits word-by-word ("word-wise") multiplications that are generally more efficient than bit-wise multiplications.

With reference to Table 2, a function MINV(a) first calculates an inverse $a^{-1}$ of an element a of $Z_p$ and then converts $a^{-1}$ to a corresponding M-residue. The AMI procedure is used first to obtain (r,k) from the function AMI(a), followed by one or two word-wise Montgomery product operations (i.e., multiplications by $2^m$ or a power thereof) using the modified Montgomery radix $R_m = 2^m$. The method of Table 2 uses at most two Montgomery product operations after computing the AMI(a), and is therefore faster and more efficient than prior art methods that require up to three Montgomery product operations.

TABLE 2

Pseudocode for obtaining an M-residue of a classical inverse

FUNCTION MINV(a), finds inverse, then M-residue
input a, p, n, m
(r,k) = AMI(a), wherein r = $a^{-1}2^k$ (mod p) and n ≦ k ≦ m + n
if n ≦ k ≦ m, then
    r = MPROD(r, $R^2$) = ($a^{-1}2^k$)($2^{2m}$)($2^{-m}$) (mod p) = $a^{-1}2^m$ = k (mod p)
    k = k + m > m
end if
r = MPROD(r, $2^{2m-k}$) = $a^{-1}2^k 2^{m-k} 2^m$ (mod p) = $a^{-1}2^m$ (mod p)
output r = $a^{-1}2^m$ (mod p)

Figure 1:
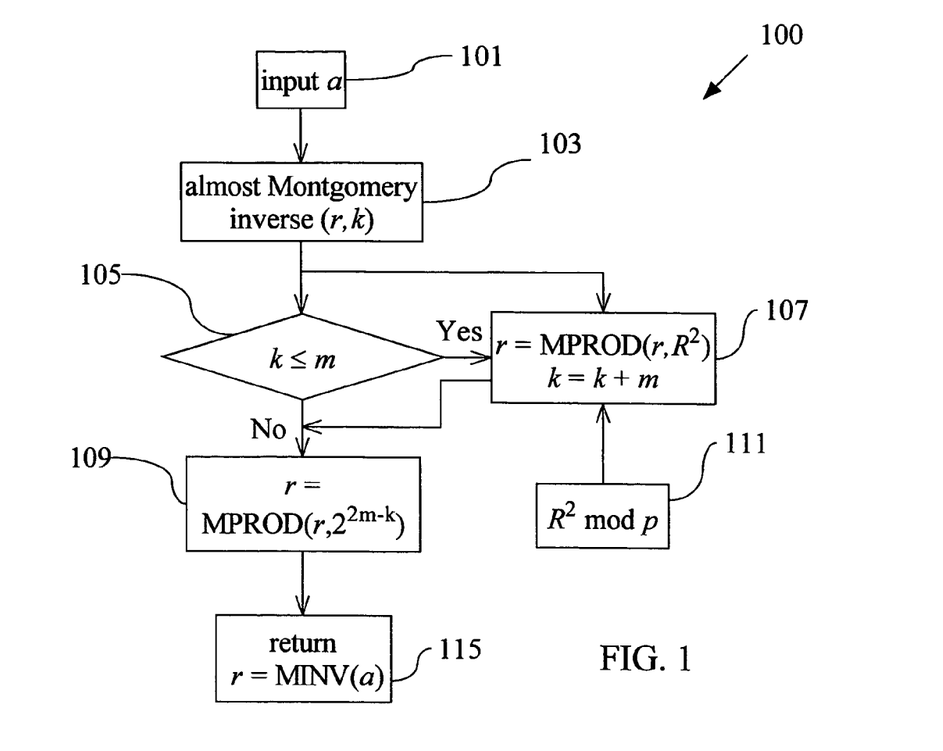
FIG. 1 is a block diagram of a method for computing a Montgomery residue of a classical inverse of an element of a complete residue set.

The procedure of Table 2 is illustrated in FIG. 1. A module 100 receives the element a (and parameters n, m, and p) as an input in an input block 101. Typically the parameters n, m, and p are stored and need not be re-entered as new elements. The element a and the remaining parameters are used by a processing block 103 that computes an intermediate value r and an integer k using an almost Montgomery inverse procedure. The values (r,k) are communicated to a decision block 105. If n≦k≦m, then the decision block 105 directs the intermediate value r to a Montgomery-product block 107 to compute a Montgomery-product of the intermediate value of r and $R^2$. The Montgomery-product block 107 also assigns k a value of k+m. Typically, a storage block 111 stores a value or $R^2$ mod p for retrieval by the Montgomery-product block 107. After the calculations performed in the Montgomery-product block 107 are complete, or if such calculations were unnecessary, then a Montgomery-product block 109 computes a Montgomery product of the intermediate value r with $2^{m-k}$. After completion of the Montgomery-product block 109, an output block 115 returns a final value of r that is the M-residue of the classical inverse.

The classical inverse $a^{-1}$=CINV(a) also can be obtained using the AMI procedure and the modified Montgomery radix $R_m$. With reference to Table 3, the classical inverse $a^{-1}$=CINV(a) is calculated by evaluating the function AMI (a), followed by at most two MPROD operations (Montgomery products) with 1 and $2^{m-k}$. Word-wise computation of the classical inverse using the function AMI(a) and the modified Montgomery radix $R_m$ is efficient.

TABLE 3

Pseudocode for determining a classical inverse CINV(a)

Figure 2:
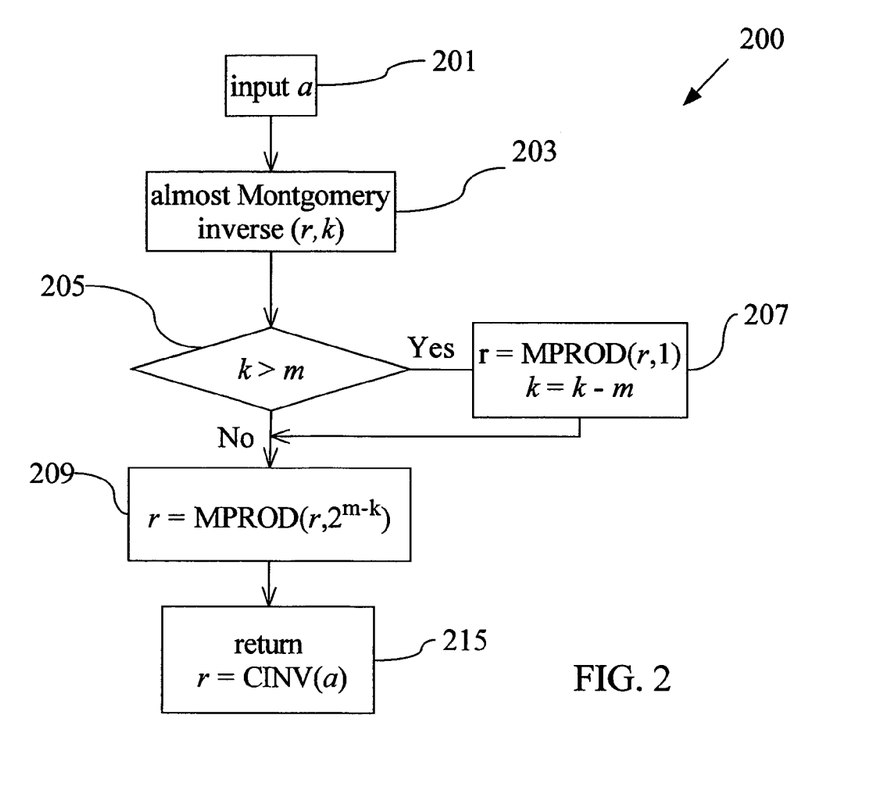
FIG. 2 is a block diagram of a method for computing a classical inverse of an element of a complete residue set.

FUNCTION CINV(a)
input a, p, n , m, wherein 1 ≦ a ≦ $2^{m-1}$
(r,k) = AMI(a) = ($a^{-1}2^k$ (mod p), k), wherein n ≦ k ≦ m + n
if k > m, then
    r = MPROD (r,1) = ($a^{-1}2^k$) ($2^{-m}$) = $a^{-1}2^{k-m}$ (mod p)
    k = k-m < m
r = MPROD (r, $2^{m-k}$) = ($a^{-1}$) $2^k 2^{m-k} 2^{-m}$ = $a^{-1}$ (mod p)
return r The procedure of Table 3 is illustrated in FIG. 2. A module 200 receives the element a and values of p, m, and n as inputs in an input block 201. As noted above, the values p, m, and n can be retrieved from storage. A processing block 203 computes an intermediate value r and an integer k using an almost Montgomery inverse procedure. The values (r,k) are communicated to a decision block 205. If k≦m, then a Montgomery-product block 207 computes a Montgomery product of r with 1 and decrements k by m. The intermediate value r from the Montgomery-product block 207 (k≧m) or the decision block 205 (k<m) is directed to a Montgomery-product block 209 that computes a Montgomery product of the intermediate value r with $2^{m-k}$. After completion of the calculation in the Montgomery-product block 209, an output block 215 returns a final value of r that is the classical inverse of the element a.

As noted above, the Montgomery product of the Montgomery inverse KINV(a) and a is 1 (mod p). Unfortunately, 1 (mod p) is the M-residue of $2^m$ and is not the M-residue of the product a $a^{-1}$. The product of a and $a^{-1}$ preferably corresponds to the M-residue of a a–1, i.e., $2^m$ (mod p). Accordingly, an "alternative Montgomery inverse" NINV (A) is defined as:

$$NINV(A) = NINV(a2^m) = (a2^m)^{-1} 2^{2m} \pmod{p} = a^{-1} 2^m \pmod{p}.$$

As defined herein, NINV(A) is a function of the M-residue A. A Montgomery product MPROD of an M-residue A with the alternative inverse NINV(A) is:

$$MPROD(A, NINV(A)) = (a2^m)(a^{-1} 2^m) 2^{-m} = 2^m \pmod{p}.$$

Thus, the product $2^m$ mod p is the M-residue corresponding to the product a $a^{-1}$ with respect to the modified radix $R_m$.

The alternative Montgomery inverse NINV(A) can be obtained by several methods. In one method, the alternative Montgomery inverse NINV(A) is computed by first calculating KINV(A)=KINV(a2$^m$)=(a2$^m$)$^{-1}$ 2$^m$=a$^{-1}$(mod p), and then calculating a Montgomery product MPROD of KINV (A) with R$^2$=2$^{2m}$:

MPROD (KINV(A), R$^2$)=MPROD (a$^{-1}$, R$^2$)=a$^{-1}$ 2$^{2m}$ 2$^{-m}$=a$^{-1}$2$^m$ (mod p).

In a second method, the alternative Montgomery inverse NINV(A) is computed by first calculating a Montgomery product of A=a2$^m$ with the number 1:

MPROD(a2$^m$,1)=(a2$^m$) (1) (2$^{-m}$)=a (mod p), and then calculating a Kaliski inverse KINV(a):

KINV(a)=a$^{-1}$2$^m$ (mod p).

In a third method illustrated in Table 4, NINV(a) is calculated by first calculating the almost Montgomery inverse AMI(A) to produce values (r, k). Then, two or three Montgomery products of r are calculated (with R$^2$ and 2$^{2m-k}$), depending on the value of k returned by AMI(a2$^m$). The method of Table 4 uses at most three MPROD operations in addition to the AMI procedure.

TABLE 4

Pseudocode for determining an alternative inverse NINV(A)

FUNCTION NINV(A)
Input A = a2$^m$ (mod p), p, n, m
(r,k) = AMI(a2$^m$ (mod p)) = (a$^{-1}$2$^{-m}$2$^k$ (mod p),k), wherein
n ≦ k ≦ m + n
    if n ≦ k ≦ m then
        r = MPROD (r, R$^2$) = (a$^{-1}$2$^{-m}$2$^k$)2$^{2m}$2$^{-m}$ = a$^{-1}$2$^k$(mod p)
        k = k + m > m
end if
r = MPROD (r, R$^2$) = (a$^{-1}$2$^{-m}$2$^k$)2$^{2m}$2$^{-m}$ = a$^{-1}$2$^k$(mod p)
r = MPROD (r, 2$^{2m-k}$) = (a$^{-1}$2$^k$) (2$^{2m-k}$) (2$^{-m}$) = a$^{-1}$2$^m$(mod p)
return r = a$^{-1}$2$^m$(mod p)

Figure 3:
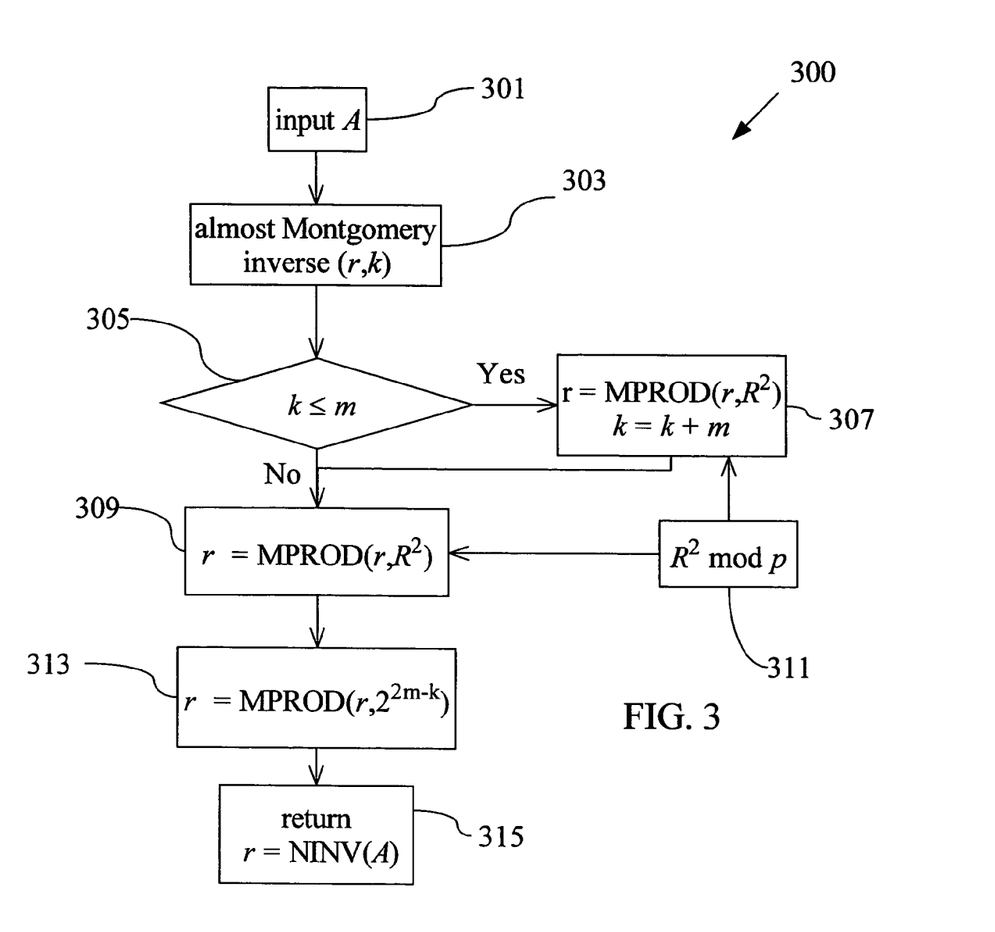
FIG. 3 is a block diagram of a method for computing an alternative Montgomery residue.

The procedure of Table 4 is illustrated in FIG. 3. A module 300 receives the element A in an input block 301. The element A is communicated to a processing block 303 that computes an intermediate value r and an integer k using an almost Montgomery inverse method. The values (r,k) are then communicated to a decision block 305. If n≦k≦m, then a Montgomery-product block 307 computes a Montgomery product of the intermediate value r with R$^2$. For convenience, a value of R$^2$ mod p can be retrieved from a storage block 311. After completion of the calculation in the Montgomery-product block 307 or after exiting the decision block 305, Montgomery-product blocks 309, 313 compute Montgomery products with R$^2$ and 2$^{2m-k}$, respectively, wherein each of the Montgomery-product blocks 309, 313 assigns the intermediate value r a new value equal to a result of the corresponding Montgomery product operation. An output block 315 returns a final value of r that is equal to the alternative inverse NINV(A).

As described above, these methods for determining NINV (A) use the modified Montgomery radix R$_m$ and can use word-wise multiplication. Because the determination of the alternative Montgomery inverse NINV(A) calculations can use a pre-computed value of R$^2$ (mod p), computation of NINV(A) can be fast and efficient.

C-language modules for implementing several of the methods described above are provided in Appendix A.

A total computation time for NINV( ), according to the invention, can be significantly faster than the bit-wise calculation of KINV( ). Furthermore, the alternative inverse is an inverse of a with respect to the Montgomery product operation, i.e., MPROD(a, NINV(a))=2$^m$(mod p), which is the M-residue of a a$^{-1}$.

These improved methods of Montgomery multiplication and the determination of inverses with respect to Montgomery multiplication have application to encryption and decryption systems used to provide computer data security and secure transmission of data, including financial data and text, over insecure communication channels such as the Internet and wireless systems such as cellular telephone systems. In addition, systems for user authentication use Montgomery multiplication methods. Such systems are important in many applications, but especially in financial transactions in which it is critical to determine that a particular user has authorized a particular purchase or fund transfer. These systems represent text messages, numerical data (such as financial data), or user access information (e.g., passwords, public keys, private keys, authentication codes, or other encryption/decryption parameters) as words comprising a series of binary bits. These words are referred to herein as "messages" for convenience. These messages can be manipulated using the above methods to facilitate encryption and decryption.

Figure 4:
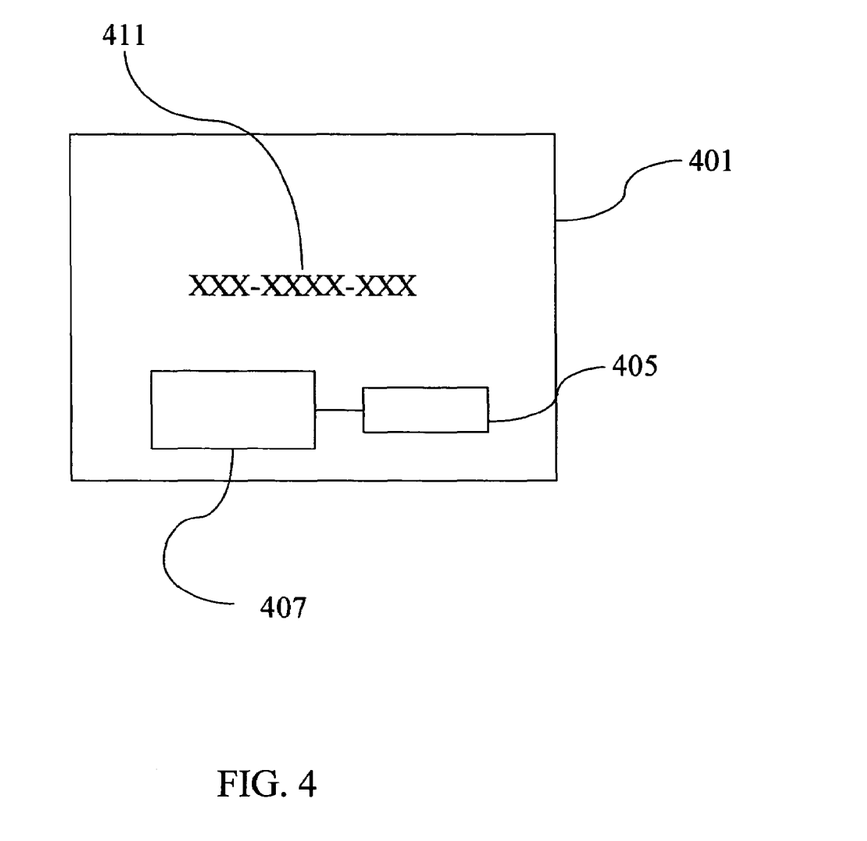
FIG. 4 is a schematic diagram of a smartcard that includes a cryptographic processor module.

Cryptographic systems and apparatus can include modules or software components that perform necessary arithmetic operations such as the Montgomery inversions and other operations described above. Such modules can include dedicated (application-specific) integrated circuits or other processing hardware. Alternatively, the Montgomery operations can be implemented in software that is executed on a general purpose microprocessor. For example, as shown in FIG. 4, a smartcard 401 includes a cryptographic module 407, typically implemented as a combination of hardware and software and a user identifier 411. The cryptographic protocols used by the smartcard 401 are implemented by the cryptographic module 407 that is in communication with a processor module 405 that implements various mathematical operations associated with encryption and decryption. The processor module 405 includes hardware, software, or a combination of hardware and software for determining Montgomery inverses and classical inverses of sequences of binary digits as well as Montgomery multiplication.

One specific example of a cryptographic system includes an encryption processor that receives unencrypted data or text ("plaintext"), typically as a computer file, and produces encrypted data or text ("ciphertext"). In a representative application to elliptical curve cryptography, a quantity eP is to be determined, wherein e is an integer and P is a point on an elliptic curve defined over the finite field GF(p). This determination requires addition of points P, Q, i.e., P+Q, and a doubling operation P+P=2P. Such point operations typically require several modular additions and multiplications, and an inversion. An inversion operation is used to compute a quantity λ=(y$_2$−y$_1$)(x$_2$−x$_1$)$^{-1}$, wherein points P and Q are specified with coordinates (x$_1$, y$_1$) and (x$_2$, y$_2$). Using NINV( ), this computation can be performed as follows:

NINV((x$_2$−x$_1$) 2$^m$))=(x$_2$−x$_1$)$^{-1}$ 2$^m$ (mod p)

MPROD((y$_2$−y$_1$) 2$^m$, (x$_2$−x$_1$)$^{-1}$ 2$^m$)=λ2$^m$, as required. Because this result is an M-residue, subsequent computations can be performed without transformation of a C-residue to an M-residue. As a result, not only are the wordwise procedures faster than conventional procedures, the wordwise procedures can omit C- to M-residue transformations, further increasing computational speed.

As another example, in an RSA encryption/decryption system, prime numbers p, q are selected and a product n=pq computed. In addition, a quantity f(n)=(p−1)(q−1) is calculated, and another integer e is chosen such that the greatest common denominator of e and f(n) is 1. Finally, a quantity $d=e^{-1} \mod (f(n))$ is calculated.

Typically, the values of e, n are publicly known and provide a so-called public key. The values of d, p, q are kept secret. A plaintext T is encrypted to produce a ciphertext U as $U=T^e \mod n$, using the public key. The ciphertext U is decrypted to recover the plaintext as $T=U^d \mod n$. These computations are conveniently performed using Montgomery multiplication and Montgomery inverses to decrease the complexity of the encryption and decryption operations. In particular, determination of the parameter d is facilitated using the Montgomery inversion methods described herein.

While the invention is described with reference to several examples, it will be understood, by those skilled in the art to which the invention pertains, that the examples may be modified without departing from the spirit and scope of the invention that is to be limited only by the appended claims.

We claim:

1. A computer-readable medium containing instructions for performing a method for transforming a message represented as an element of a complete residue set modulo a prime number p into a Montgomery residue of a multiplicative inverse, the method comprising:
   selecting a Montgomery radix $R=2^m$, wherein m is an integer multiple of a wordsize, and m is greater than a bit-length of the prime number p;
   determining (r, k) from an almost Montgomery inverse function;
   determining if k is less than m;
   if k is determined to be less than m, assigning r a value obtained as a Montgomery product of r and $R^2 \mod p$, and assigning k a value k=k+m;
   obtaining the multiplicative inverse as a Montgomery product of r and $2^{2m-k}$; and
   retrieving a stored value of $R^2 \mod p$.

2. A cryptographic system for encryption and decryption, the system comprising a module for transforming a message according to a method comprising:
   representing the message as an element of a complete residue set modulo a prime number p;
   selecting a Montgomery radix $R=2^m$, wherein m is an integer multiple of a wordsize, and m is greater than a bit-length of the prime number p;
   determining (r, k) from an almost Montgomery inverse function;
   if k is less than m, then assigning r a value obtained as a Montgomery product of r and $R^2 \mod p$, and assigning k a value k=k+m;
   obtaining the multiplicative inverse as a Montgomery product of r and $2^{2m-k}$; and
   representing the transformed message as a Montgomery residue of the multiplicative inverse.

3. A cryptographic system, comprising an encryption/decryption module that performs a method for obtaining a classical inverse of a message, comprising:
   assigning a series of binary digits to the message, wherein the assigned binary digits represent an element of a residue set modulo a prime number p;
   obtaining values (r,k) by calculating an almost Montgomery inverse function of the representation of the message using a Montgomery radix $R=2^m$, wherein m is an integer multiple of a wordsize and is greater than a bit-length of the prime number p;
   if k is greater than m, then assigning r a value equal to a Montgomery product of r and 1, and assigning k a value of k−m; and
   calculating the classical inverse as a Montgomery product of r and $2^{m-k}$.

4. The cryptographic system of claim 3, further comprising at least one integrated circuit.

5. A computer-readable medium, comprising instructions for performing a method for obtaining a classical inverse of a message, comprising:
   assigning a series of binary digits to the message, wherein the assigned binary digits represent an element of a residue set modulo a prime number p;
   obtaining values (r,k) by calculating an almost Montgomery inverse function of the representation of the message using a Montgomery radix $R=2^m$, wherein m is an integer multiple of a wordsize and is greater than a bit-length of the prime number p;
   if k is greater than m, then assigning r a value equal to a Montgomery product of r and 1, and assigning k a value of k−m; and
   calculating the classical inverse as a Montgomery product of r and $2^{m-k}$.

6. A computer-readable medium containing instructions for performing a method for computing a multiplicative inverse of an M-residue $A=a2^m \mod p$, wherein p is a prime number, m is an integer, and a Montgomery radix $R=2^m$, the method comprising:
   associating a message with the M-residue;
   computing an intermediate product r and an integer k using an almost Montgomery inverse procedure;
   determining if k is less than or equal to m, and, if so, assigning k a value of k+m;
   retrieving a value of $R^2 \mod p$;
   assigning an intermediate product r' the value of a Montgomery product of r and $R^2$; and
   obtaining the multiplicative inverse as a Montgomery product of r' and $2^{2m-k}$.

* * * * *

UNITED STATES PATENT AND TRADEMARK OFFICE
CERTIFICATE OF CORRECTION

PATENT NO. : 7,050,579 B1 Page 1 of 1
APPLICATION NO. : 09/558138
DATED : May 23, 2006
INVENTOR(S) : Koç et al.

It is certified that error appears in the above-identified patent and that said Letters Patent is hereby corrected as shown below:

On the Title Page under Other Publications on Page 2, second Col. line 9, "GF(2 $^m$)" should read -- GF($2^m$) --

Column 6, line 38, "k $\leq$ m" should read -- k $\geq$ m --

Column 6, line 52, "a-$^1$" should read -- $a^{-1}$ --

Column 9, line 10, "U=T$^{0}$" should read -- U=T$^e$ --

Signed and Sealed this

Twenty-eighth Day of November, 2006

JON W. DUDAS
*Director of the United States Patent and Trademark Office*